US009253785B2

United States Patent
Jalloul et al.

(10) Patent No.: US 9,253,785 B2
(45) Date of Patent: Feb. 2, 2016

(54) MULTI-CELL INCREMENTAL REDUNDANCY

(71) Applicant: Broadcom Corporation, Irvine, CA (US)

(72) Inventors: Louay Jalloul, San Jose, CA (US); Djordje Tujkovic, Santa Clara, CA (US); Ahmad Mohammed, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 228 days.

(21) Appl. No.: 13/886,955

(22) Filed: May 3, 2013

(65) Prior Publication Data

US 2013/0294367 A1    Nov. 7, 2013

Related U.S. Application Data

(60) Provisional application No. 61/642,967, filed on May 4, 2012.

(51) Int. Cl.
| | | |
|---|---|---|
| *H04W 4/00* | (2009.01) | |
| *H04W 72/08* | (2009.01) | |
| *H04B 7/02* | (2006.01) | |
| *H04B 17/16* | (2015.01) | |

(52) U.S. Cl.
CPC ............. *H04W 72/082* (2013.01); *H04B 7/024* (2013.01); *H04B 17/16* (2015.01)

(58) Field of Classification Search
None
See application file for complete search history.

(56) References Cited

U.S. PATENT DOCUMENTS

| | | | |
|---|---|---|---|
| 7,631,247 B2 * | 12/2009 | Petrovic et al. ............... | 714/776 |
| 8,386,875 B2 * | 2/2013 | Earnshaw et al. ............. | 714/751 |
| 8,537,037 B2 * | 9/2013 | Majonen ......................... | 341/87 |
| 8,908,624 B2 * | 12/2014 | Sfar et al. ....................... | 370/329 |
| 2009/0259907 A1* | 10/2009 | Chernyshev et al. ......... | 714/748 |
| 2010/0265874 A1* | 10/2010 | Palanki et al. ................ | 370/315 |
| 2011/0110251 A1* | 5/2011 | Krishnamurthy et al. .... | 370/252 |
| 2011/0312319 A1* | 12/2011 | Lindoff et al. ................ | 455/423 |
| 2013/0021987 A1* | 1/2013 | Ho et al. ....................... | 370/329 |
| 2013/0040675 A1* | 2/2013 | Ant et al. ...................... | 455/509 |
| 2013/0229971 A1* | 9/2013 | Siomina et al. ............... | 370/312 |
| 2013/0272170 A1* | 10/2013 | Chatterjee et al. ............ | 370/280 |
| 2014/0328328 A1* | 11/2014 | Lindoff et al. ................ | 370/332 |

* cited by examiner

*Primary Examiner* — Phirin Sam
(74) *Attorney, Agent, or Firm* — Sterne, Kessler, Goldstein & Fox P.L.L.C.

(57) ABSTRACT

Embodiments enable cooperative transmissions from a group of cells (can include the serving cell and one or more neighboring cells) to a user equipment (UE). The cooperative transmissions emulate Hybrid Automatic Repeat Request (HARQ) transmissions to the UE. Specifically, when the UE is experiencing high interference, the UE's serving cell can create a transmit incremental redundancy (IR) group for the UE, which is used to transmit information in a HARQ-like fashion to the UE. Because interference is reduced, the UE can decode the information at a lower coding rate and higher coding gain.

24 Claims, 14 Drawing Sheets

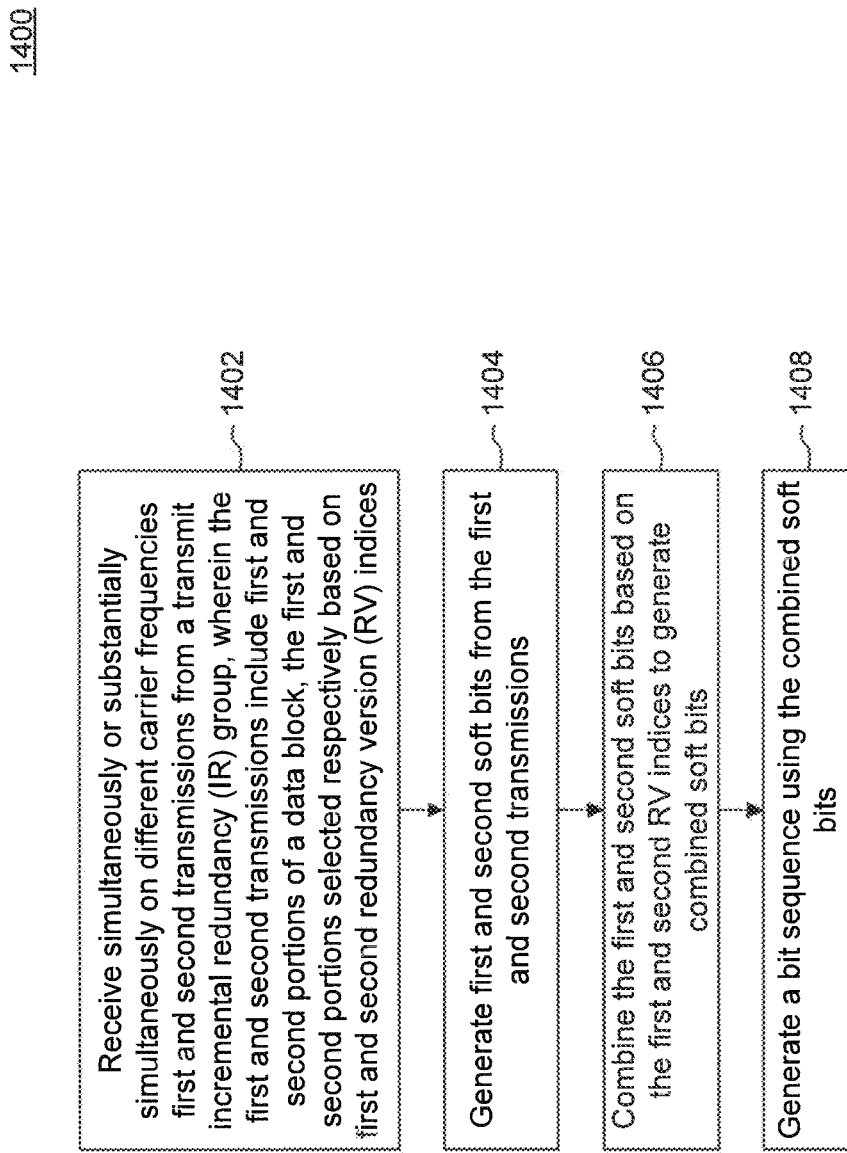

MULTI-CELL INCREMENTAL REDUNDANCY

CROSS-REFERENCE TO RELATED APPLICATIONS

The present invention claims the benefit of U.S. Provisional Application No. 61/642,967, filed May 4, 2012, which is incorporated herein by reference in its entirety.

BACKGROUND

1. Field of the Invention

The present disclosure relates generally to multi-cell incremental redundancy schemes for wireless communication access networks.

2. Background Art

In wireless communication access networks, such as cellular networks for example, user performance is largely limited by interference from neighboring cells. For example, in a single frequency network (SFN), about 30% of the users have a Carrier-to-Interference and Noise Ratio (CINR) of 0 dB or below. Interference is particularly a concern for users that happen to be located at radio cell edges (cell edge users) due to proximity to neighboring cells.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

FIGS. 11-14 illustrates example processes for processing transmissions from a transmit IR group by a LTE according to embodiments.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

In the following disclosure, terms defined by the Long-Term Evolution (LTE) standard are sometimes used. For example, the term "eNodeB" is used to refer to what is commonly described as base station (BS) or base transceiver station (BTS) in other standards. The term "User Equipment (UE)" is used to refer to what is commonly described as a mobile station (MS) or mobile terminal in other standards. However, as will be apparent to a person of skill in the art based on the teachings herein, embodiments are not limited to the LTE standard and can be applied to other wireless communication standards.

Figure 1:
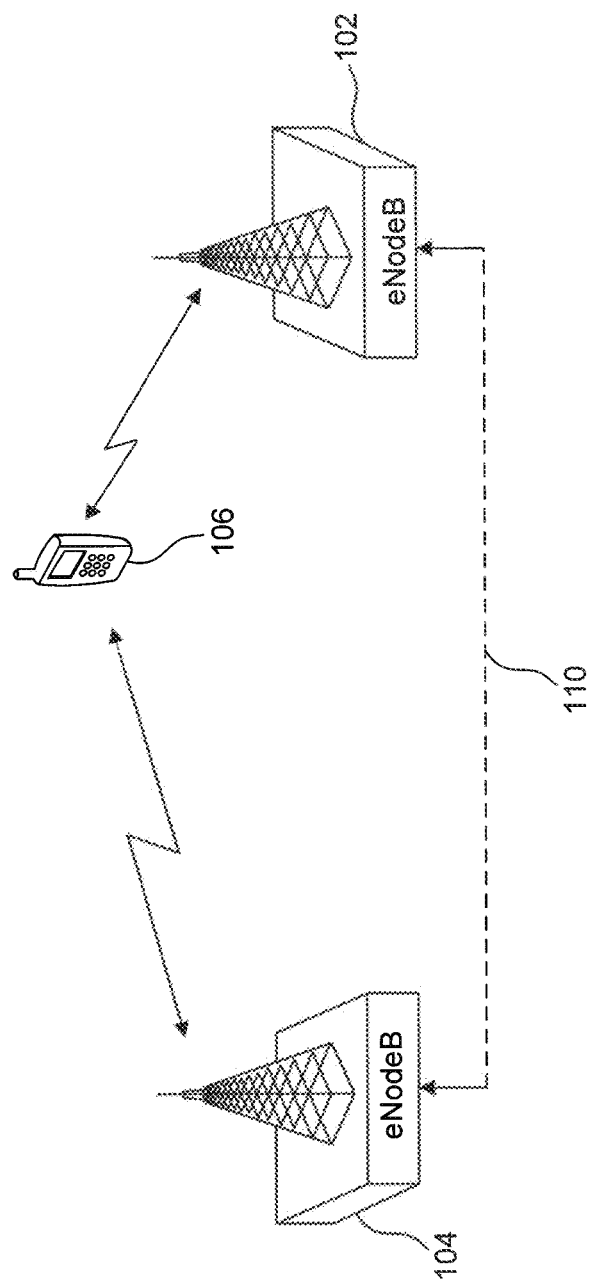
FIG. 1 illustrates an example cellular network environment in which embodiments can be used or implemented.

FIG. 1 illustrates an example cellular network environment 100 in which embodiments can be used or implemented. Example cellular network environment 100 is provided for the purpose of illustration only and is not limiting of embodiments. As will be apparent to a person of skill in the art, embodiments are not limited to cellular networks and may be applied to other types of wireless communication networks.

As shown in FIG. 1, example network environment 100 includes an Evolved Node B (eNodeB) 102, an eNodeB 104, and a User Equipment (UE) 106. eNodeB 102 and eNodeB 104 may communicate via a backhaul network (e.g., X2 interface) link 110. UE 106 can be any wireless device capable of cellular-based communication, including a cellular phone, tablet, laptop, etc. eNodeBs 102 and 104 may each support a plurality of serving cells (each serving cell is the equivalent of a base station and has a unique cell ID that identifies it to UEs). Depending on its receiver capabilities, UE 106 may communicate with one or more serving cells of eNodeB 102 and/or eNodeB 104.

For the purpose of illustration of embodiments, it is assumed that UE 106 is served by a first cell located at eNodeB 102, but due to its location (e.g., at edge of the radio cell served by eNodeB 102) can receive transmissions from a second cell located at eNodeB 104. These transmissions can be intended to other UEs served by the second cell and therefore may appear as interference at UE 106. According to embodiments, however, the second cell can be configured to cooperate with the first cell in order to transmit cooperatively to UE 106. Specifically, as farther described below, the first cell and the second cell can communicate via link 110 to transmit the same information to UE 106 with different degrees of redundancy. In an embodiment, the degree of redundancy used depends on the level of interference at UE 106. For example, when UE 106 experiences a high level of interference, high redundancy can be used to enable UE 106 to decode the transmitted information at a low coding rate.

Further description of embodiments is provided below. As would be understood by a person of skill in the art based on the teachings herein, embodiments are not limited by the above example scenario. In other embodiments, more than one interfering cell can be used. Further, the interfering cell(s) can be located at the same eNodeB (eNodeB 102) as the serving cell of UE 106 or at different eNodeBs.

Figure 2:
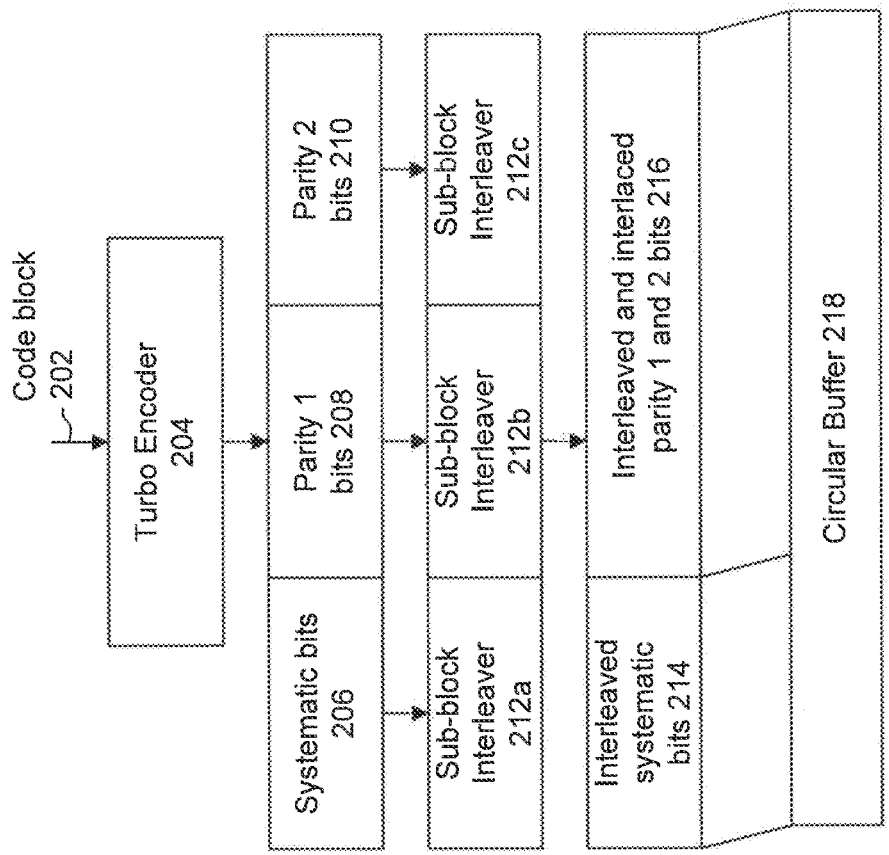
FIG. 2 illustrates an example cell processing for the downlink shared channel (DL-SCH) according to the Long-Term Evolution (LTE) standard.

FIG. 2 illustrates example cell processing 200 for the downlink shared channel (DL-SCH) according to the Long-Term Evolution (LTE) standard. The LTE DL-SCH is used to transmit data from a serving cell to a UE. Example processing 200 can be performed by a cell to channel encode a data code block intended to a UE before transmission to the UE.

As shown in FIG. 2, example processing 200 includes a code block 202 (e.g., intended for UE 106) being input into a turbo encoder 204 to generate an encoded block comprising systematic bits 206 (which correspond to the bits of code block 202), parity 1 bits 208, and parity 2 bits 210. In an embodiment, turbo encoder 204 uses a code rate equal to 1/3. In other embodiments, other types of encoders can be used. Subsequently, systematic bits 206, parity 1 bits 208, and parity 2 bits 210 are input into respective sub-block interleavers 212a, 212b, and 212c to generate interleaved systematic bits 214 and interleaved and interlaced parity 1 and parity 2 bits 216. Systematic bits 214 and parity bits 216 are then used to fill a circular buffer 218, the contents of which are transmitted to the UE.

Figure 3:
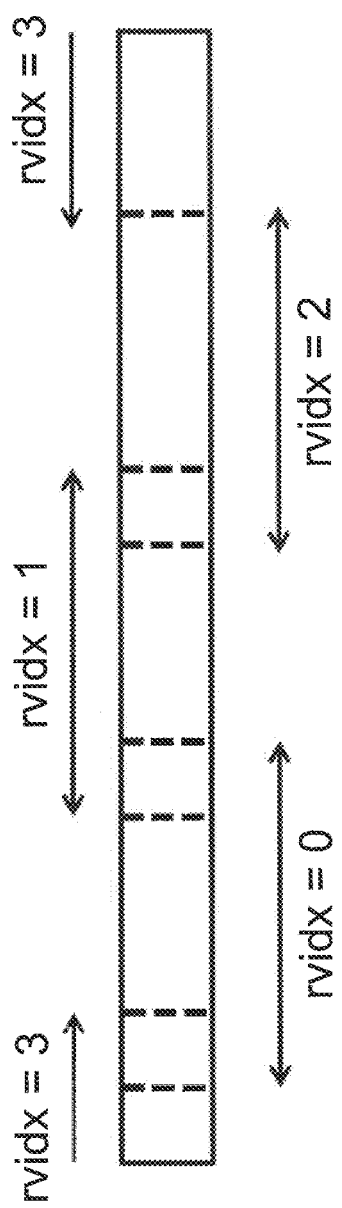
FIG. 3 illustrates an example circular buffer for storing a coded data block according to the LTE standard.

Typically, the serving cell transmits the contents of circular buffer 218 gradually to the UE by sending at each time a portion of the data block contained in buffer 218. For example, referring to FIG. 3, which illustrates an example circular buffer 300, the cell can send at each transmission (or retransmission) to the UE a portion of circular buffer 300, as identified by a redundancy version (RV) index. The value of the RV index determines an offset into circular buffer 300 from which transmission begins to the UE and defines a portion of circular buffer 300. In an embodiment, multiple RV indices are provided, which may provide for overlap between successive transmissions (or retransmissions) from the serving to the UE.

In Hybrid Automatic Repeat Request (HARQ) (which is used by LTE), the UE responds by an acknowledgment (ACK) or a non-acknowledgment (NACK) after each transmission from the serving cell. When a transmitted portion of circular buffer 300 (e.g., the portion identified by rvidx=0) is erroneously decoded by the UE, the UE sends a NACK to the serving cell, which can retransmit all or a part of the circular buffer. The UE can combine the initially transmitted portion with the retransmission for improved decoding (at a lower coding rate). In one approach (chase combining), the retransmission from the serving cell contains the same buffer portion as the initially transmitted portion. In another approach (incremental redundancy), the retransmission from the serving cell may contain a part of the initial transmitted portion and an additional buffer portion not previously transmitted. For example, referring to FIG. 3, the cell may transmit the portion of circular buffer 300 identified by rvidx=0, and in response to a NACK from the UE may transmit the portion identified by rvidx=1 (instead of repeating the portion identified by rvidx=0).

Typically, when the UE is experiencing high interference (e.g., when the UE is at the cell edge), the serving cell of the UE resorts to performing the above HARQ process (by itself) to send information to the UE, repeating transmissions as needed. While this can help the UE, interference from neighboring cells can continue to hamper reception at the UE.

Embodiments, as further described below, enable cooperative transmissions from a group of cells (can include the serving cell and one or more neighboring cells) to a UE, which emulate HARQ transmissions from the serving cell to the UE. Specifically, when the UE is experiencing high interference, the UE's serving cell can create a transmit incremental redundancy (IR) group for the UE, which is used to transmit information in a HARQ-like fashion to the UE. Because interference is reduced, the UE can decode the information at a lower coding rate and higher coding gain.

Figure 4:
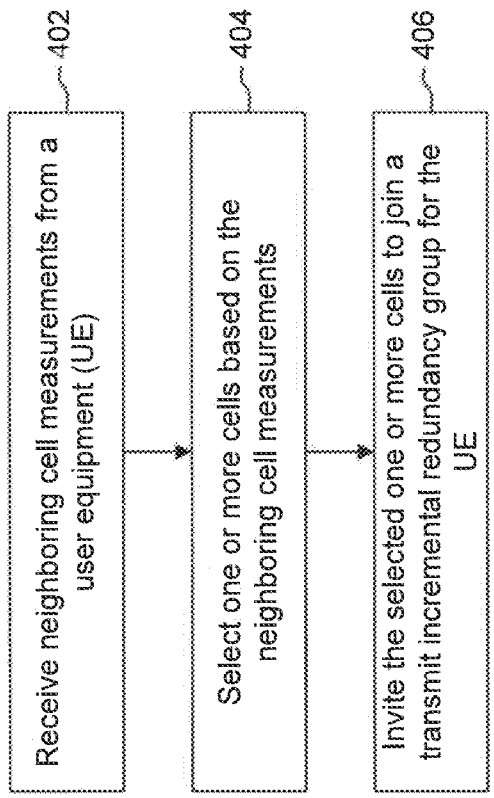
FIG. 4 illustrates an example process for creating a transmit incremental redundancy (IR) group for a user equipment (UE) according to an embodiment.

FIG. 4 illustrates an example process 400 for creating a transmit incremental redundancy (IR) group for a user equipment (UE) according to an embodiment. Example process 400 is provided for the purpose of illustration only and is not limiting of embodiments. Example process 400 can be performed by a primary (serving) cell of the UE, for example, and may be performed periodically and/or depending on the mobility rate of the UE.

As shown in FIG. 4, process 400 begins in step 402, which includes receiving neighboring cell measurements from the UE. In an embodiment, the neighboring cell measurements include signal strength measurements associated with neighboring cells detected by the UE. For example, in example environment 100, UE 106 may send to its primary cell at eNodeB 102 a signal strength measurement for a detected neighboring cell located at eNodeB 102 or eNodeB 104. In an embodiment, the neighboring cell measurement for a detected cell includes a Reference Signal Receive Power (RSRP) and/or a Receive Signal Receive Quality (RSRQ) measurement performed by the UE on reference signals transmitted by the detected cell. In an embodiment, the UE sends all of the neighboring cell measurements that it determines irrespective of their levels to the primary cell. In another embodiment, the UE sends only those measurements that are above a certain threshold to the primary cell. In another embodiment, step 402 further includes receiving from the UE cell identifiers (IDs) of the cells that correspond to the received neighboring cell measurements.

Subsequently, process 400 proceeds to step 404, which includes selecting one or more cells based on the received neighboring cell measurements. In an embodiment, step 404 further includes comparing a received neighboring cell measurement to a predetermined threshold, and selecting a cell associated with the received neighboring cell measurement when the received neighboring cell measurement is above the threshold. In another embodiment, the UE sends only those measurements that are above the predetermined threshold, and thus step 404 includes only identifying the cells (e.g., using the cell IDs) associated with the received measurements. Alternatively or additionally, in another embodiment, cells are selected up to a maximum number in step 404. For example, in an embodiment, only the cells that corresponds to the largest n neighboring cell measurements (where n is an integer) are selected. This may be with or without regard to whether a neighboring cell measurement is above the predetermined threshold.

Finally, once the one or more cells are selected in step 404, process 400 proceeds to step 406, which includes inviting the selected one or more cells to join a transmit incremental redundancy (IR) group for the UE. In an embodiment, step 406 further includes communicating with the selected one or more cells to send invitations to join the transmit IR group and to receive responses to the invitations. According to embodiments, members of an transmit IR group may include cells that are co-located with the primary cell (e.g., located on the same physical tower of the cellular network, or associated with the same eNodeB, etc.), cells that are located in different sectors of the same radio cell as the primary cell, or cells that are located in different radio cells of the cellular network as the primary cell. In an embodiment, when a selected cell is located at another eNodeB, the primary cell communicates with the selected cell using a backhaul interface (e.g., X2 interface) to send the invitation to join the transmit IR group and to receive the response to the invitation.

In another embodiment, once the transmit IR group has been created by the primary cell, process 400 further includes signaling the created transmit IR group to the UE, for example by signaling the cell IDs of members of the transmit IR group to the UE. Process 400 may further include signaling a redundancy version (RV) index of at least the primary cell to the UE (in an embodiment, the RV indices of other members of the transmit IR group are also signaled to the UE; in another embodiment, the UE infers the RV indices of the other members of the transmit IR group from the RV index of the primary cell). This may be done periodically by the primary cell on a downlink control channel of the primary cell. The UE can use the signaled RV index/indices, as further described below, to determine how to combine transmissions from the transmit IR group to fill out its own circular buffer. In an embodiment, the primary cell signals to the UE that transmission from the IR group is about to begin (rather from just the primary cell); where the IR group includes only two cells (i.e., the primary cell and a secondary cell), the signaling can be done using just one bit (single bit feedback), which can be sent on a downlink control channel to the UE.

Once the transmit IR group for a UE has been created and signaled to the UE, the transmit IR group can begin transmitting cooperatively to the UE. In an embodiment, the primary cell of the UE shares with other members of the transmit IR group a data block intended for the UE. The data block may be the content of its circular buffer described above in FIGS. 2 and 3. The transmit IR group can send the data block to the UE with same or different IR versions, as further described below.

FIGS. 5-8 illustrate example processes for transmitting a data block from a transmit IR group to a UE according to embodiments. The data block may be the content of the circular buffer of the primary cell of the UE as described above in FIGS. 2 and 3. These example processes are provided for the purpose of illustration only and are not limiting of embodiments. According to embodiments, the primary cell can dynamically vary the transmit IR group for the UE as desired, and can also dynamically vary the transmission scheme with which data blocks are transmitted to the UE by the transmit IR group. For example, the primary cell can vary the transmission scheme from using the same IR version to using different IR versions, or vice versa. Alternatively or additionally, the primary cell can vary the transmission scheme from using the same carrier frequency (and/or PRBs) to using different carrier frequencies (and/or PRBs), or vice versa. In an embodiment, the primary cell can vary the transmission scheme dynamically on a data block basis (every n data blocks, where n is ≥1) or a sub-block basis (within a data block), for example, and signal the members of the transmit IR group and the UE accordingly.

Figure 5:
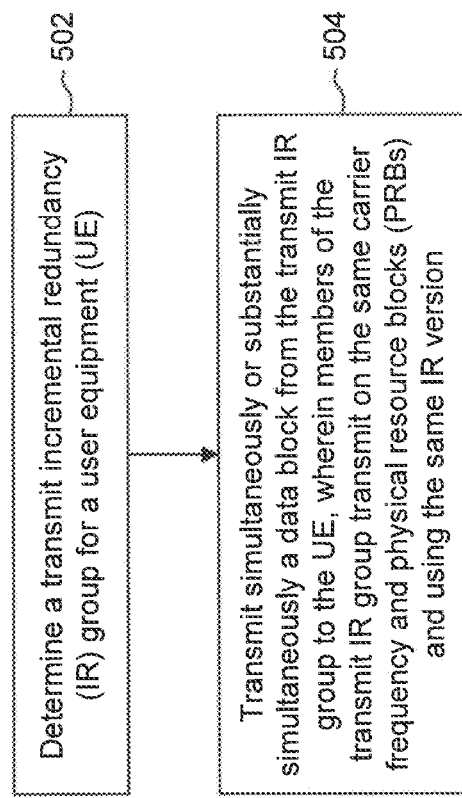
FIGS. 5-8 illustrate example processes for transmitting a data block from a transmit IR group to a UE according to embodiments.

FIG. 5 illustrates an example process 500 for transmitting a data block from a transmit IR group to a UE according to an embodiment. As shown in FIG. 5, process 500 begins in step 502, which includes determining a transmit IR group for the UE. In an embodiment, step 502 includes the primary cell of the UE performing a process such as example process 400 described above and to create a transmit IR group for the UE. Step 502 may further include other members of the transmit IR group communicating with the primary cell to indicate acceptance to join the transmit IR group for the UE and to receive the data block to be transmitted to the UE.

Subsequently, process 500 proceeds to step 504, which includes transmitting simultaneously or substantially simultaneously the data block from the transmit IR group to the UE, with members of the transmit IR group transmitting on the same carrier frequency and physical resource blocks (PRBs) and using the same IR version. (In LTE, a PRB is 12 Orthogonal Frequency Division Multiplexing (OFDM) subcarriers for the duration of an LTE slot (0.5 msec)). Transmitting using the same IF version includes transmitting simulta- neously or substantially simultaneously the same portion of the data block from every member of the transmit IR group to the UE. For example, referring to FIG. 3, in a first transmission interval, every member of the transmit IR group transmits the portion of the data block identified by RV index 0 (rvidx=0) to the UE. In a subsequent transmission interval, every member of the transmit IR group transmits the portion of the data block identified by RV index 1 (rvidx=1) to the UE (in another example, they can transmit the portion identified by RV index 2 (rvidx=2) or RV index 3 (rvidx=3)). By each transmitting the data block according to the same sequence of RV indices, the transmit IR group transmits the data block to the UE using the same IR version. In an embodiment, the cells that form the transmit IR group are synchronized (e.g., using Global Navigation System (GPS) time) such that their transmissions arrive within a cyclic prefix (CP) of each other at the UE.

Figure 6:
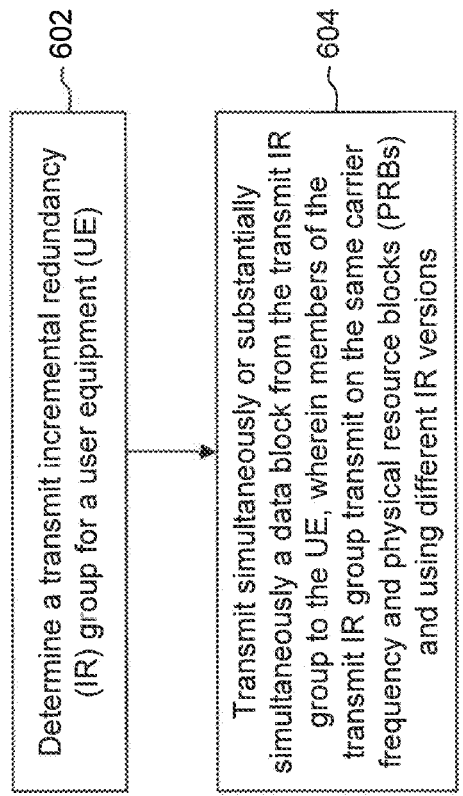

FIG. 6 illustrates another example process 600 for transmitting a data block from a transmit IR group to a UE according to an embodiment. As shown in FIG. 6, process 600 begins in step 602, which includes determining a transmit IR group for the UE. In an embodiment, step 602 includes the primary cell of the UE performing a process such as example process 400 described above and to create a transmit IR group for the UE. Step 602 may further include other members of the transmit IR group communicating with the primary cell to indicate acceptance to join the transmit IR group for the UE and to receive the data block to be transmitted to the UE.

Subsequently, process 600 proceeds to step 604, which includes transmitting simultaneously or substantially simultaneously the data block from the transmit IR group to the UE, with members of the transmit IR group transmitting on the same carrier frequency and physical resource blocks (PRBs) and using different IR versions. Transmitting using different versions includes transmitting simultaneously or substantially simultaneously different portions of the data block from each member of the transmit IR group to the UE. In an embodiment, the cells that form the transmit IR group are synchronized (e.g., using GPS time) such that their transmissions arrive within a cyclic prefix (CP) of each other at the UE.

For example, assuming that the transmit IR group includes a primary cell and secondary cell (in other embodiments, the transmit IR group can have more than two cells), transmitting using different IR versions includes the primary and secondary cells transmitting different first and second portions of the data block respectively to the UE. For example, referring to FIG. 3, in a first transmission interval, the first portion, which is transmitted by the primary cell, can be the portion of the data block identified by RV index 0 (rvidx=0) and the second portion, which is transmitted by the secondary cell, can be the portion of the data block identified by RV index 1 (rvidx=1). In a subsequent transmission interval, the first portion can be the portion of the data block identified by RV index 2 (rvidx=2) and the second portion can be the portion of the data block identified by RV index 3 (rvidx=3). By each transmitting the data block according to a different sequence of RV indices, the primary and secondary cells transmit the data block to the UE using different IR versions. The first and second portions can also be non-overlapping. For example, in the first transmission interval, the first portion can be the portion of the data block identified by RV index 0 (rvidx=0) and the second portion can be the portion of the data block identified by RV index 2 (rvidx=2). In the subsequent transmission interval, the first portion can be the portion of the data block identified by RV index 1 (rvidx=1) and the second portion can be the portion of the data block identified by RV index 3 (rvidx=3).

In an embodiment, the primary cell and the secondary cell use RV index sequences that are governed by the following equation:

$$rvidx(2,i) = \text{modulus}(rvidx(1,i)+2, 4)$$

where rvidx (2, i) represents the i-th RV index (e.g., used at time interval i) of the secondary cell, rvidx (1, i) represents the i-th RV index of the primary cell. In an embodiment, using RV index sequences according to this equation eliminates overlap between data block portions transmitted from the primary and secondary cells and results in a coding gain increase at the UE. In an embodiment, the primary cell signals rvidx (1, i) to the secondary cell, and the secondary cell implements the above equation to compute rvidx (2, i). The UE, upon receiving an indication from the primary cell that a transmit IR group is going to be used (e.g., consisting of the primary cell and the secondary cell), also computes rvidx (2, i) using the above equation after having received rvidx (1, i) from the primary cell.

Figure 7:
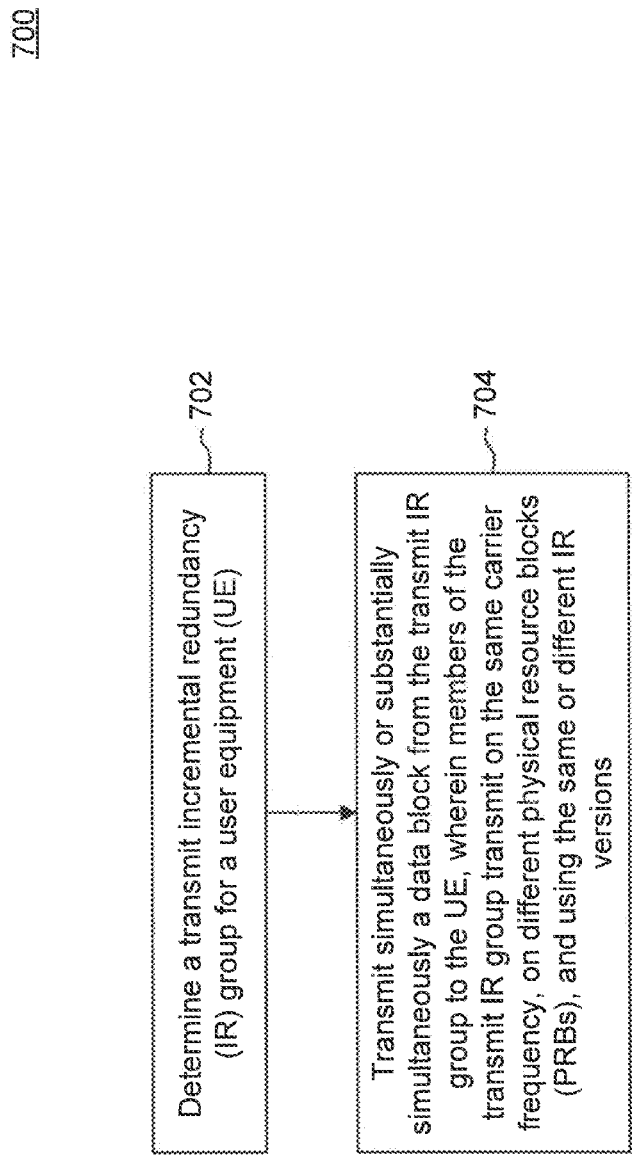

FIG. 7 illustrates another example process 700 for transmitting a data block from a transmit IR group to a UE according to an embodiment. As shown in FIG. 7, process 700 begins in step 702, which includes determining a transmit IR group for the UE. In an embodiment, step 702 includes the primary cell of the UE performing a process such as example process 400 described above and to create a transmit IR group for the UE. Step 702 may further include other members of the transmit IR group communicating with the primary cell to indicate acceptance to join the transmit IR group for the UE and to receive the data block to be transmitted to the UE.

Subsequently, process 700 proceeds to step 704, which includes transmitting simultaneously or substantially simultaneously the data block from the transmit IR group to the UE, with members of the transmit IR group transmitting on the same carrier frequency but on different physical resource blocks (PRBs), using the same or different IR versions. Transmitting using the same IR version, as described above, includes transmitting simultaneously or substantially simultaneously the same portion of the data block from every member of the transmit IR group to the UE. Transmitting using different IR versions, as described above, includes transmitting simultaneously or substantially simultaneously different portions of the data block from each member of the transmit IR group to the UE. In an embodiment, the cells that form the transmit IR group are synchronized (e.g., using GPS time) such that their transmissions arrive within a cyclic prefix (CP) of each other at the UE.

Figure 8:
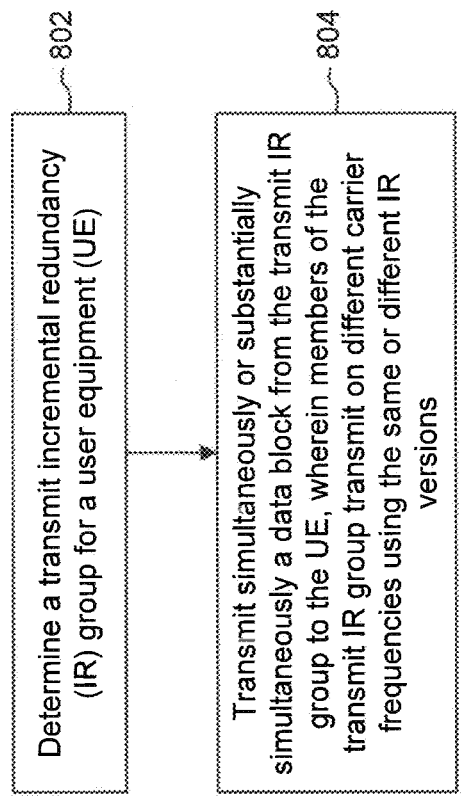

FIG. 8 illustrates another example process 800 for transmitting a data block from a transmit IR group to a UE according to an embodiment. As shown in FIG. 8, process 800 begins in step 802, which includes determining a transmit IR group for the UE. In an embodiment, step 802 includes the primary cell of the UE performing a process such as example process 400 described above and to create a transmit IR group for the UE. Step 802 may further include other members of the transmit IR group communicating with the primary cell to indicate acceptance to join the transmit IR group for the UE and to receive the data block to be transmitted to the UE.

Subsequently, process 800 proceeds to step 804, which includes transmitting simultaneously or substantially simultaneously the data block from the transmit IR group to the UE, with members of the transmit IR group transmitting on different carrier frequencies, using the same or different IR versions. In an embodiment, the transmit IR group includes cells providing a carrier aggregation (CA) transmission scheme to the UE, whereby component carriers (CCs) of different carrier frequencies are configured/dedicated for the UE at each member of the transmit IR group, to increase throughput to the UE.

In the following, example processes that can be performed at the UE in order to process transmissions received from the transmit IR group of the UE are provided. These example processes are provided for the purpose of illustration and are not limiting to embodiments. As would be understood by a person of skill in the art based on the teachings herein, the process used by the UE to process transmissions from the transmit IR group depend, in part, on the transmission scheme used by the transmit IR group, including, for example, the IR version configuration, the carrier frequencies, and/or the physical resource blocks (PRBs) used by the transmit IR group.

Figure 9:
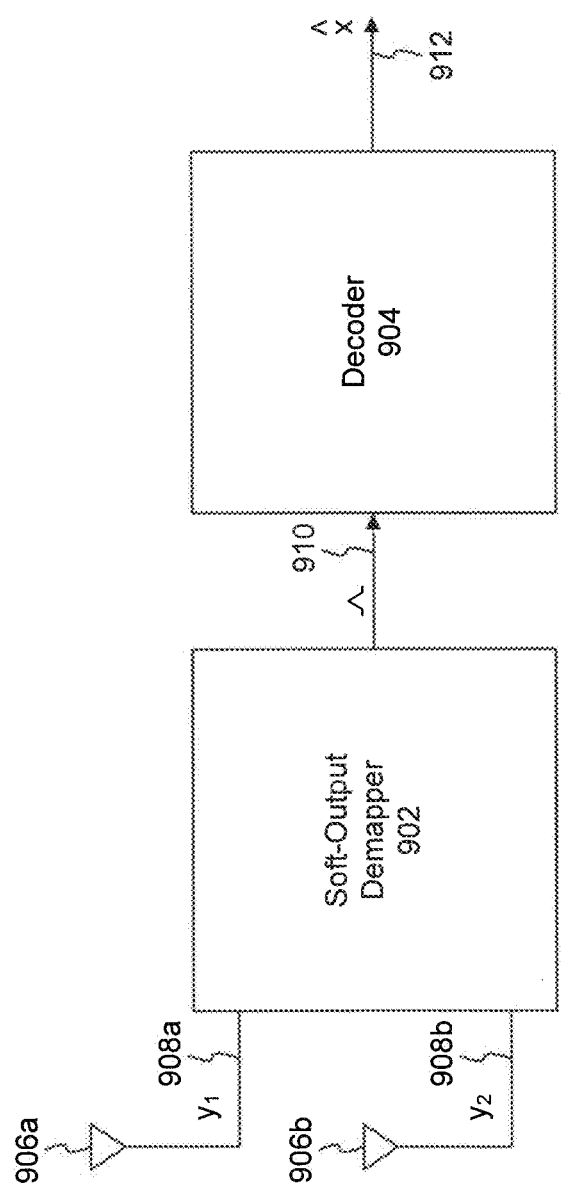
FIG. 9 illustrates an example UE receiver according to an embodiment.

FIG. 9 illustrates an example UE receiver 900 according to an embodiment, which can be used to perform the below described UE processes. Example UE receiver 900 is provided for the purpose of illustration only and is not limiting of embodiments. As would be understood by a person of skill in the art based on the teachings herein, receiver 900 can include additional elements, which are omitted for the purpose of simplification in FIG. 9. Also, for the purpose of illustration only, example receiver 900 is shown to include two receive antennas. However, in other embodiments, receivers with a single or more than two antennas can also be used. For example, whenever linear processing is used by receiver 900, a single receive antenna can generally be used as would be understood by a person of skill in the art based on the teachings herein.

As shown in FIG. 9, example receiver 900 includes first and second receive antennas 906a and 906b, a soft-output demapper 902, and a decoder 904. First and second receive antennas 906a and 906b are configured to receive signals. For example, first and second receive antennas 906a and 906b can be configured to receive simultaneously or substantially simultaneously first and second transmissions from a transmit incremental redundancy (IR) group of the UE, comprised for example of a primary cell and a secondary cell. As such, the signal received by each receive antenna 906a and 906b includes a component due to the first transmission and a component due to the second transmission.

Based on the signals received by receive antennas 906a and 906b, signals 908a and 908b are generated respectively and provided to soft-output demapper 902. As would be understood by a person of skill in the art, additional processing is performed typically between receive antennas 906a and 906b and soft-output demapper 902 (e.g., low-noise filtering, down-conversion, digital-to-analog conversion, and demodulation). Soft-output demapper 902 is configured to generate soft bits 910 from signals 908a and 908b. A soft bit is a representation of the likelihood of an encoded bit to have a logic 0 value or a logic 1 value. One soft bit representation, Log Likelihood Ratio (LLR) (commonly represented mathematically with the Greek letter $\Lambda$), assigns a numeric value (e.g., from −128 to +127) depending on the bit likelihood, with negative values indicating likelihood of a logic 0 value (−127 representing the highest likelihood that the bit is a logic 0 value), positive values indicating likelihood of a logic 1 value (+127 representing the highest likelihood that the bit is a logic 1 value), and a 0 value indicating a "don't know" condition (the demapper has no information to resolve the bit one way or another).

In an embodiment, soft-output demapper 902 is configured to perform linear processing on signals 908a and 908b to generate first soft bits and second soft bits from signals 908a and 908b respectively. For example, signals 908a and 908b may be due to first and second transmissions (note that each of signals 908a and 908b includes a component due to the first transmission and a component due to the second transmission) from a transmit IR group of the UE, comprised for example of a primary cell and a secondary cell. When the primary cell and the secondary cell transmit using the same IR version (transmit the same portion of a data block), transmit on the same carrier frequency but different PRBs, or transmit on different carrier frequencies (e.g., CA), soft-output demapper 902 can generate the first and second soft bits by processing signals 908a and 908b separately. Then, based on the IR version used by the transmit IR group, soft-output demapper 902 combines the first and second soft bits appropriately to generate soft bits 910. For example, if the same IR version is used by the transmit IR group, soft-output demapper 902 can sum, soft bit by soft bit, the first soft bits and the second soft bits to generate soft bits 910 (each soft bit 910 is the sum of a first soft bit and a corresponding second soft bit). Alternatively, if different IR versions are used by the transmit IR group, soft-output demapper 902 combines the first and second soft bits while accounting for the different RV indices used by the transmit IR group and/or any puncturing (removal of bits, generally parity bits, after encoding) performed at the primary and/or secondary cell (e.g., for rate matching). For example, the processing by soft-output demapper 902 can include determining for each first soft bit if a corresponding second soft bit exists, and if the corresponding second soft bit exists, summing the two to generate a corresponding combined soft bit 910. If no corresponding second soft bit exists (e.g., the first soft bit corresponds to a bit found in the first transmission but not in the second transmission, or is a bit that was punctured by the secondary cell), then the first soft bit is equal to the corresponding soft bit 910. The same processing can be done with respect to the second soft bits.

In another embodiment, soft-output demapper 902 is configured to perform non-linear processing (e.g., using a non-linear joint detector such as a Maximum Likelihood Detector (MLD)) on signals 908a and 908b to generate soft bits 910. According to this processing, soft bits 910 are generated immediately in a combined form (e.g., the combination occurs at the soft bit level, rather than after generating the respective soft bits from each transmission) using joint detection based on signals 908a and 908b. For example, signals 908a and 908b may be due to first and second transmissions from a transmit IR group of the UE, comprised for example of a primary cell and a secondary cell. When the primary cell and the secondary cell transmit, on the same carrier frequency and PRBs, using different IR versions, soft-output demapper 902 can generate soft bits 910 by non-linear processing of signals 908a and 908b. In generating soft bits 910, the processing by demapper 902 accounts for the different RV indices used by the first and second transmissions and/or any puncturing performed at the primary and/or secondary cell (e.g., for rate matching).

Decoder 910 is configured to receive soft bits 910 and to generate a bit sequence 912 using soft bits 910. For example, signals 908a and 908b may be due to first and second transmissions (note that each of signals 908a and 908b includes a component due to the first transmission and a component due to the second transmission) from a transmit IR group of the UE, comprised for example of a primary cell and a secondary cell. When the primary cell and the secondary cell transmit using the same IR version to transmit the same portion of a data block, bit sequence 912 corresponds to the transmitted same portion. Alternatively, when the primary cell and the secondary cell transmit using different IR versions such that the primary cell transmit a first portion of the data block and the secondary cell transmits a second portion of the data block, bit sequence 912 corresponds to a combination of the first and second portions, accounting for any redundancy due to overlap between the first and second portions.

Figure 10:
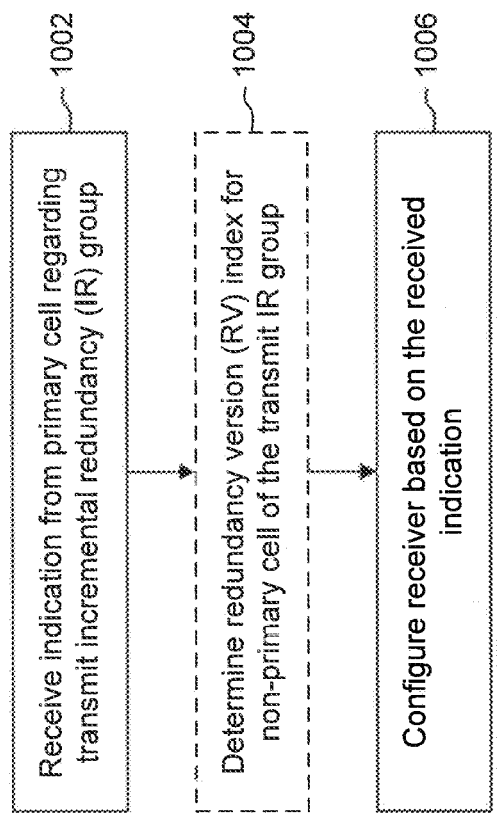
FIG. 10 illustrates an example process for configuring a UE based on a transmit IR group associated with the UE according to an embodiment.

FIG. 10 illustrates an example process 1000 for configuring a UE based on a transmit IR group associated with the UE according to an embodiment. Example process 1000 is provided for the purpose of illustration only and is not limiting of embodiments. Example process 1000 can be performed by the UE to configure its receiver depending on properties of the transmit IR group configured for the UE. As described above, the transmit IR group as well as the transmission scheme used by the transmit IR group can be varied dynamically according to embodiments. As such, the UE may perform process 1000 when a new transmit IR group/transmission scheme is configured for the UE.

As shown in FIG. 10, process 1000 begins in step 1002, which includes receiving an indication from a primary cell of the UE regarding a transmit IR group configured for the UE. In an embodiment, the indication includes an indication of members of the transmit IR group (e.g., cells IDs of the cells that form the transmit IR group). In an embodiment, the indication is received by the UE on the downlink control channel of the primary cell. In addition, step 1002 may include receiving a RV index of at least the primary cell.

Subsequently, process 1000 proceeds to step 1004, which includes determining a RV index for a non-primary cell of the transmit IR group. For example, the transmit IR group may include a primary cell of the UE and a secondary cell. As such, step 1004 includes determining the RV index of the secondary cell. In an embodiment, the RV index of the secondary cell is determined based on the RV index of the primary cell. For example, the UE may determine the RV index of the secondary cell using the formula: rvidx (2, i)=modulus (rvidx (1, i)+2, 4); where rvidx (2, i) represents the i-th RV index (e.g., used at time interval i) of the secondary cell, rvidx (1, i) represents the i-th RV index of the primary cell. In another embodiment, the primary cell signals to the UE the RV indices of all members of the transmit IR group. As such, process 400 proceeds from step 1002 to step 1006, without performing step 1004.

Finally, in step 1006, process 1000 includes configuring a receiver of the UE based on the received indication in step 1002. In an embodiment, step 1006 includes configuring the receiver appropriately to being receiving from a transmit IR group. In an embodiment, step 1006 includes configuring the receiver for linear processing or non-linear processing based on the transmission scheme used by the transmit IR group. Additionally, step 1006 can include turning on or off one or more receive antennas (and associated RF processing chains) depending on the transmission scheme used by the transmit IR group. As mentioned above, generally, a single receive antenna can be used for the cases in which the receiver uses linear processing of the received transmissions. Additional receive antennas can be used to improve detection but are not necessary. When non-linear (joint detection) processing is used by the receiver, two receive antennas may be needed in some cases.

FIGS. 11-14 illustrates example processes for processing transmissions from a transmit IR group by a UE according to embodiments. These example processes can be performed by the receiver of the UE, such as example receiver 900 described above, for example. These example processes are provided for the purpose of illustration and are not limiting to embodiments. As would be understood by a person of skill in the art based on the teachings herein, the process used by the UE to process transmissions from the transmit IR group depend, in part, on the transmission scheme used by the transmit IR group, including, for example, the IR version configuration, the carrier frequencies, and/or the physical resource blocks (PRBs) used by the transmit IR group.

Figure 11:
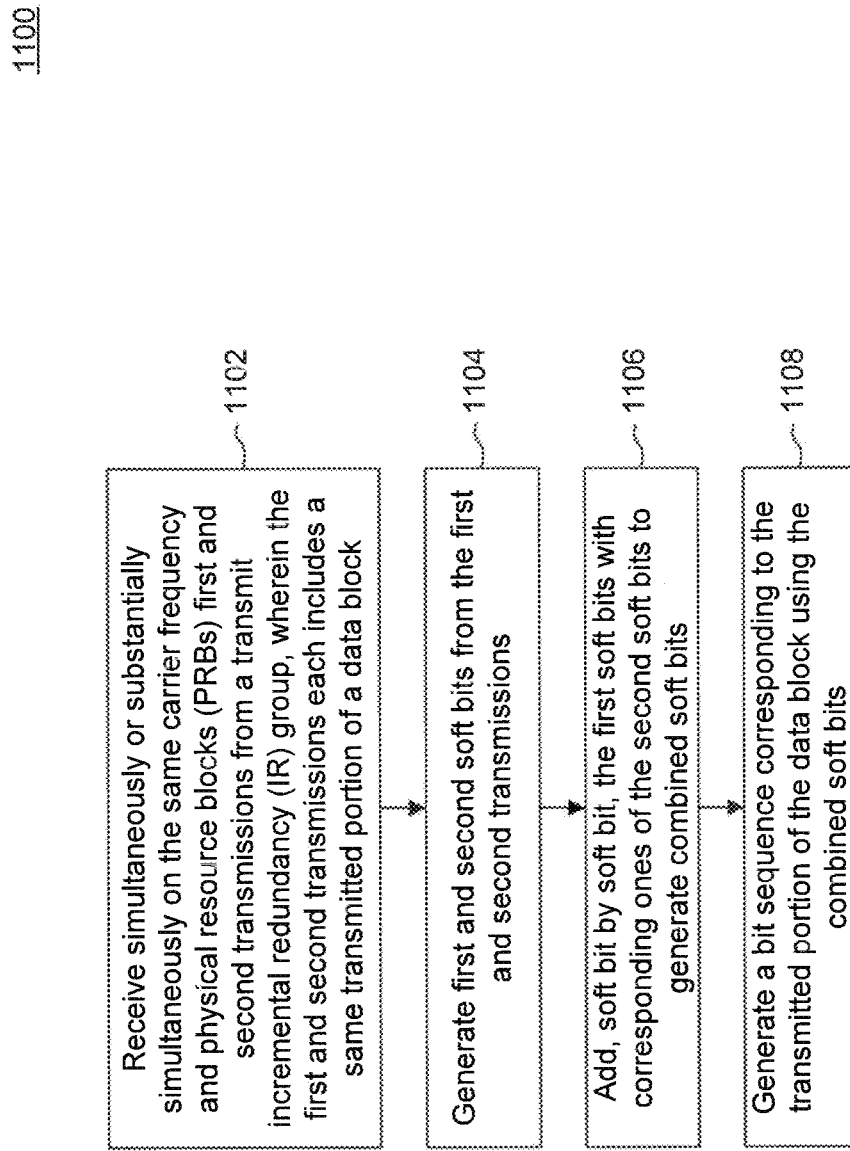

FIG. 11 illustrates an example process 1100 for processing transmissions from a transmit IR group according to an embodiment. For the purpose of illustration only, it is assumed that the transmit IR group includes a primary cell and a secondary cell that transmit first and second transmissions to the UE. However, as would be understood by a person of skill in the art based on the teachings herein, embodiments are not limited to this example and can extend to any number of transmissions to the UE from any number of cells.

As shown in FIG. 11, process 1100 begins in step 1102, which includes receiving simultaneously or substantially simultaneously, on the same carrier frequency and physical resource blocks (PRBs), first and second transmissions from the transmit IR group, with the first and second transmissions including a same portion of a data block. In an embodiment, the UE knows that the first and second transmissions include the same portion of the data block by virtue of the primary cell signaling the IR version used by the transmit IR group to the UE. This may include signaling the RV index of the primary cell, which is adopted by the other cells of the transmit IR group.

In an embodiment, the UE uses a receiver such as example receiver 900 with first and second receive antennas for receiving the first and second transmissions from the primary cell and the secondary cell respectively. Accordingly, the signals $y_1$ and $y_2$ received at the first and second receive antennas respectively (each of which includes a component due to the first transmission and a component due to the second transmission) can be represented mathematically as:

$$\begin{bmatrix} y_1 \\ y_2 \end{bmatrix} = \begin{bmatrix} h_{11} & h_{12} \\ h_{21} & h_{22} \end{bmatrix} \begin{bmatrix} x \\ x \end{bmatrix} + \begin{bmatrix} n_1 \\ n_2 \end{bmatrix}$$

where x corresponds to the (same) portion of the data block transmitted by both the primary cell and the secondary cell; $h_{11}$ and $h_{21}$ represent the downlink channel from the primary cell to the first and second receive antennas respectively; $h_{12}$ and $h_{22}$ represent the downlink channel from the secondary cell to the first and second receive antennas respectively; and $n_1$ and $n_2$ represent additive noise at the first and second receive antennas respectively. From the above mathematical representation, an estimate vector of x can be determined as:

$$\hat{x} = \begin{bmatrix} \hat{h}_{11} + \hat{h}_{12} \\ \hat{h}_{21} + \hat{h}_{22} \end{bmatrix}^H \begin{bmatrix} y_1 \\ y_2 \end{bmatrix}$$

where $\hat{h}_{11}$, $\hat{h}_{21}$, $\hat{h}_{12}$, and $\hat{h}_{22}$ represent estimates of $h_{11}$, $h_{21}$, $h_{12}$, and $h_{22}$, respectively.

In an embodiment, the estimate vector is provided to a demodulator of the UE's receiver, the output of which is then fed to the soft-output demapper.

Returning to process 1100, step 1104 includes generating first soft bits and second soft bits from the first and second transmissions. In an embodiment, as described above, because the primary cell and the secondary cell transmit the same portion of the data block, step 1104 includes linearly processing the signals received by the first and second receive antennas separately to generate the first and second soft bits.

Subsequently, step 1106 includes combining, soft bit by soft bit, the first soft bits with corresponding ones of the second soft bits to generate combined soft bits. In an embodiment, steps 1104 and 1106 are performed by a soft-output demapper, such as demapper 902 for example.

Finally, process 1100 terminates in step 1108, which includes generating a bit sequence corresponding to the transmitted (same) portion of the data block using the combined soft bits. Step 1108 can be performed by a decoder such as decoder 904 for example.

Figure 12:
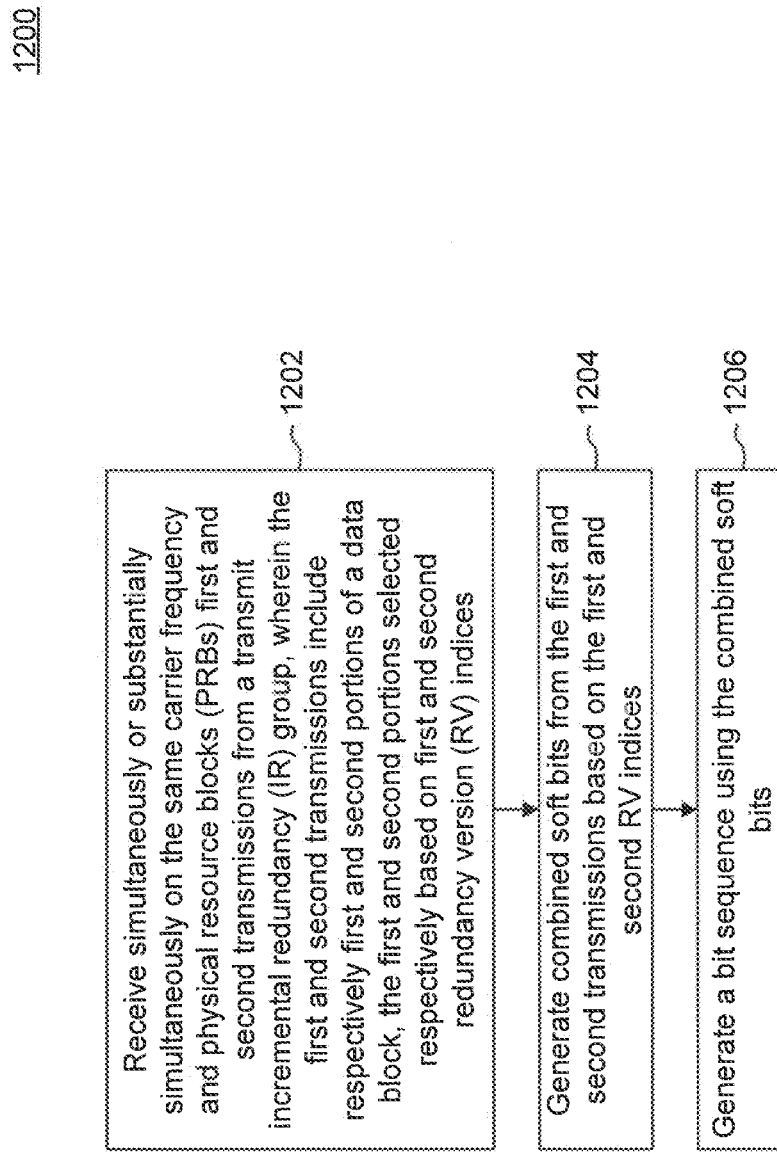

FIG. 12 illustrates an example process 1200 for processing transmissions from a transmit IR group according to an embodiment. For the purpose of illustration only, it is assumed that the transmit IR group includes a primary cell and a secondary cell that transmit first and second transmissions to the UE. However, as would be understood by a person of skill in the art based on the teachings herein, embodiments are not limited to this example and can extend to any number of transmissions to the UE from any number of cells.

As shown in FIG. 12, process 1200 begins in step 1202, which includes receiving simultaneously or substantially simultaneously, on the same carrier frequency and physical resource blocks (PRBs), first and second transmissions from the transmit IR group, with the first and second transmissions including first and second portions respectively of a data block, and the first and second portions being selected respectively based on first and second redundancy version (RV) indices. In an embodiment, the UE knows that the first and second transmissions include different portions of the data block by virtue of the primary cell signaling the IR versions used by the transmit IR group to the UE. This may include signaling the RV index of the primary cell only and the UE inferring the RV indices of other cells of the transmit IR group, or signaling the RV indices of all cells of the transmit IR group.

In an embodiment, the UE uses a receiver such as example receiver 900 with first and second receive antennas for receiving the first and second transmissions from the primary cell and the secondary cell respectively. Accordingly, the signals received at the first and second receive antennas can be represented mathematically as:

$$y = Hx + n$$

where $$y = \begin{bmatrix} y_1 \\ y_2 \end{bmatrix}, H = \begin{bmatrix} h_{11} & h_{12} \\ h_{21} & h_{22} \end{bmatrix}, x = \begin{bmatrix} x_1 \\ x_2 \end{bmatrix}, n = \begin{bmatrix} n_1 \\ n_2 \end{bmatrix},$$

and where $x_1$ and $x_2$ correspond to the first and second portions of the data block transmitted respectively by the primary cell and the secondary cell. As described above, $y_1$ and $y_2$ represent the signals received at the first and second receive antennas respectively (each of which includes a component due to the first transmission and a component due to the second transmission); $h_{11}$ and $h_{21}$ represent the downlink channel from the primary cell to the first and second receive antennas respectively; $h_{12}$ and $h_{22}$ represent the downlink channel from the secondary cell to the first and second receive antennas respectively; and $n_1$ and $n_2$ represent additive noise at the first and second receive antennas respectively.

Subsequently, process 1200 proceeds to step 1204, which includes generating combined soft bits from the first and second transmissions based on the first and second RV indices. In an embodiment, as described above, because the primary cell and the secondary cell transmit different portions of the data block on the same carrier frequency and PRBs, step 1204 includes non-linearly processing the signals received by the first and second receive antennas to generate combined soft bits. For example, the signals can be processed using a non-linear joint detector such as a MLD detector to generate the combined soft bits. According to this processing, the combined soft bits are generated immediately in a combined form (e.g., the combination occurs at the soft bit level, rather than after generating the respective soft bits from each transmission). In generating the combined soft bits, the processing accounts for the different RV indices used by the first and second transmissions and/or any puncturing performed at the primary and/or secondary cell (e.g., for rate matching).

In an embodiment, step 1204 is performed by a soft-output demapper, such as demapper 902 for example. In an embodiment, the soft-output demapper implements the following formula for generating the combined soft bits:

$$\Lambda(b_{k,i}) = \frac{1}{\sigma_n^2}\left[\min_{x \in X_{k,0}} \|y - \hat{H}x\|^2 - \min_{x \in X_{k,1}} \|y - \hat{H}x\|^2\right], k = 1, \cdots, \log_2 M_i$$

where $\Lambda(b_{k,i})$ is the LLR of the k-th bit of the symbol of the i-th cell (of the transmit IR group), $M_i$ denotes the constellation size used for the i-th cell transmission, $X_{k,j}$ denotes the part of the constellation where the k-th bit is equal to j (j=0, 1), and $\hat{H}$ is the channel matrix estimate.

Finally, process 1200 terminates in step 1206, which includes generating a bit sequence using the combined soft bits. The bit sequence corresponds to a combination of the first and second portions of the data block, accounting for any redundancy due to overlap between the first and second portions. Step 1206 can be performed by a decoder such as decoder 904 for example. By having the data block transmitted by a transmit IR group to the UE, the decoder can decode the data block at a lower rate than if only the primary cell transmitted the data block to the UE. Also, the different IR versions provide a higher coding gain at the decoder compared to using same IR version.

Figure 13:
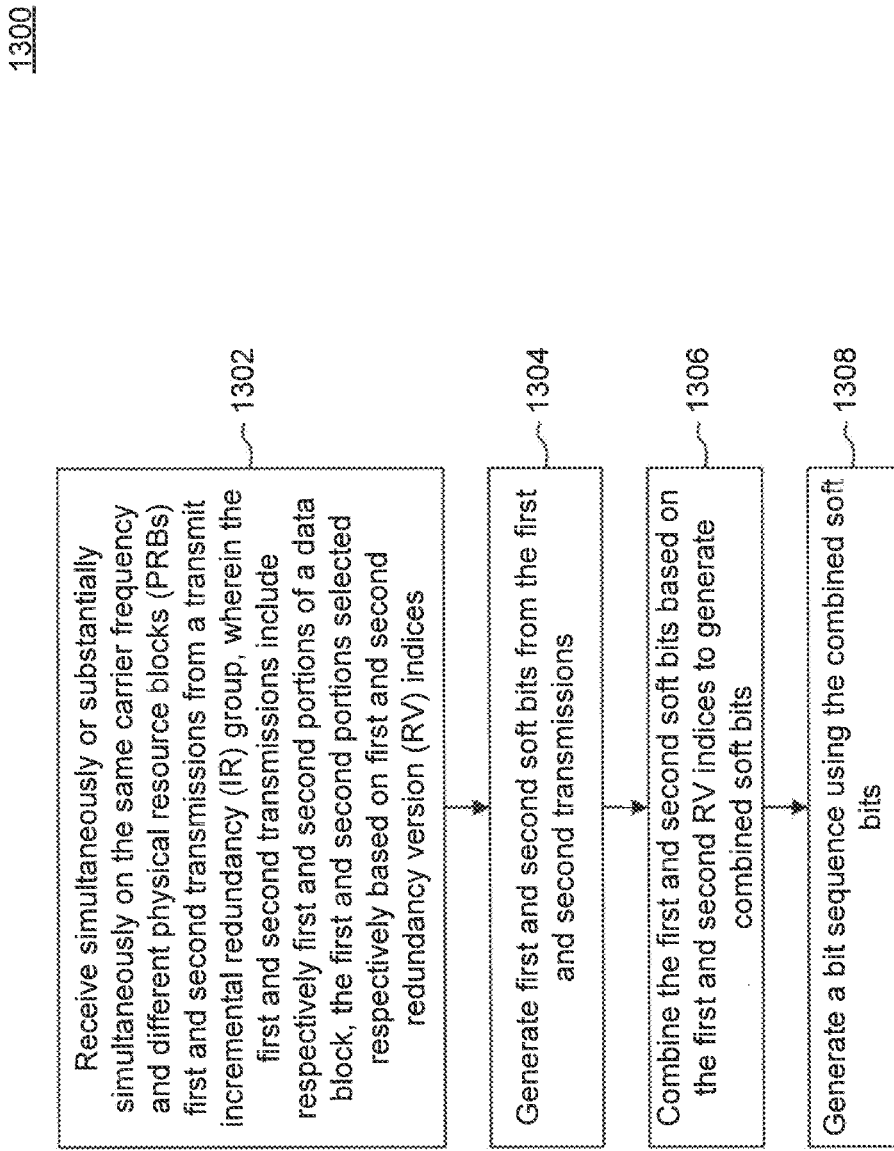

FIG. 13 illustrates an example process 1300 for processing transmissions from a transmit IR group according to an embodiment. For the purpose of illustration only, it is assumed that the transmit IR group includes a primary cell and a secondary cell that transmit first and second transmissions to the UE. However, as would be understood by a person of skill in the art based on the teachings herein, embodiments are not limited to this example and can extend to any number of transmissions to the UE from any number of cells.

As shown in FIG. 13, process 1300 begins in step 1302, which includes receiving simultaneously or substantially simultaneously, on the same carrier frequency but different physical resource blocks (PRBs), first and second transmissions from the transmit IR group, with the first and second transmissions including first and second portions respectively of a data block, and the first and second portions being selected respectively based on first and second redundancy version (RV) indices. In an embodiment, the first and second RV indices are the same and the first and second portions correspond to the same portion of the data block. In another embodiment, the first and second RV indices are different and the first and second portions correspond to different portions of the data block. In an embodiment, the UE knows that the first and second transmissions include same/different portions of the data block by virtue of the primary cell signaling the IR versions used by the transmit IR group to the UE.

In an embodiment, the UE uses a receiver such as example receiver 900 with first and second receive antennas for receiving the first and second transmissions from the primary cell and the secondary cell respectively. Accordingly, the signals $y_{1,p}$ and $y_{2,p}$ received at the first and second receive antennas respectively, over a given resource block p, can be represented mathematically as:

$$\begin{bmatrix} y_{1,p} \\ y_{2,p} \end{bmatrix} = \begin{bmatrix} h_{11,p} \\ h_{12,p} \end{bmatrix} x_p + \begin{bmatrix} n_1 \\ n_2 \end{bmatrix}$$

where $x_p$ corresponds to first/second portion of the data block transmitted by primary/secondary cell; $h_{11,p}$ and $h_{12,p}$ represent the downlink channel from the primary/secondary cell to the first and second receive antennas respectively over the resource block p; and $n_1$ and $n_2$ represent additive noise at the first and second receive antennas respectively. From the above mathematical representation, $x_p$ can be determined as:

$$x_p = \begin{bmatrix} \hat{h}_{11,p} & \hat{h}_{12,p} \end{bmatrix}^2 \begin{bmatrix} y_{1,p} \\ y_{2,p} \end{bmatrix}$$

where $\hat{h}_{11,p}$ and $\hat{h}_{12,p}$ are estimates of $\hat{h}_{11,p}$ and $h_{12,p}$ respectively.

Returning to process 1300, step 1304 includes generating first soft bits and second soft bits from the first and second transmissions. In an embodiment, as described above, because the primary cell and the secondary cell transmit over different PRBs to the UE, step 1304 includes linearly processing the signals received by the first and second receive antennas separately to generate the first and second soft bits. Subsequently, step 1306 includes combining the first soft bits and the second soft bits based on the first and second RV indices to generate the combined soft bits. If the first and second RV indices are the same, then step 1306 includes combining, soft bit by soft bit, the first soft bits with the second bits because they correspond to the same encoded bits. Alternatively, if the first and second RV indices are different, then step 1306 includes combining the first and second soft bits while accounting for the different RV indices used by the transmit IR group and/or any puncturing performed at the primary and/or secondary cell (e.g., for rate matching). In an embodiment, steps 1304 and 1306 are performed by a soft-output demapper, such as demapper 902 for example.

Finally, process 1300 terminates in step 1308, which includes generating a bit sequence using the combined soft bits. The bit sequence corresponds to a combination of the first and second portions of the data block, accounting for any redundancy due to overlap between the first and second portions. Step 1308 can be performed by a decoder such as decoder 904 for example.

FIG. 14 illustrates an example process 1400 for processing transmissions from a transmit IR group according to an embodiment. For the purpose of illustration only, it is assumed that the transmit IR group includes a primary cell and a secondary cell that transmit first and second transmissions to the UE. However, as would be understood by a person of skill in the art based on the teachings herein, embodiments are not limited to this example and can extend to any number of transmissions to the UE from any number of cells.

As shown in FIG. 14, process 1400 begins in step 1402, which includes receiving simultaneously or substantially simultaneously, on different carrier frequencies, first and second transmissions from the transmit IR group, with the first and second transmissions including first and second portions respectively of a data block, and the first and second portions being selected respectively based on first and second redundancy version (RV) indices. In an embodiment, the UE is configured for carrier aggregation (CA) from the primary cell and the secondary cell, and the first and second transmissions are received respectively on intra-frequency (on different bands) first and second component carriers (CCs) dedicated to the UE. In an embodiment, the first and second RV indices are the same and the first and second portions correspond to the same portion of the data block. In another embodiment, the first and second RV indices are different and the first and second portions correspond to different portions of the data block. In an embodiment, the UE knows that the first and second transmissions include same/different portions of the data block by virtue of the primary cell signaling the IR versions used by the transmit IR group to the UE.

Subsequently, process 1400 proceeds to step 1404, which includes generating first soft bits and second soft bits from the first and second transmissions. In an embodiment, as described above, because the primary cell and the secondary cell transmit over different carrier frequencies to the UE, step 1404 includes linearly processing the signals received by the first and second receive antennas separately to generate the first and second soft bits. Subsequently, step 1406 includes combining the first soft bits and the second soft bits based on the first and second RV indices to generate the combined soft bits. If the first and second RV indices are the same, then step 1406 includes combining, soft bit by soft bit, the first soft bits with the second bits because they correspond to the same encoded bits. Alternatively, if the first and second RV indices are different, then step 1406 includes combining the first and second soft bits while accounting for the different RV indices used by the transmit IR group and/or any puncturing performed at the primary and/or secondary cell (e.g., for rate matching). In an embodiment, steps 1404 and 1406 are performed by a soft-output demapper, such as demapper 902 for example.

Finally, process 1400 terminates in step 1408, which includes generating a bit sequence using the combined soft bits. The bit sequence corresponds to a combination of the first and second portions of the data block, accounting for any redundancy due to overlap between the first and second portions. Step 1408 can be performed by a decoder such as decoder 904 for example.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method for transmitting a data block from a group of cells to a user equipment (UE), comprising:
   receiving from the UE, by a primary cell, a neighboring cell measurement associated with a secondary cell;
   selecting the secondary cell to join a transmit incremental redundancy (IR) group for the UE based on the neighboring cell measurement, wherein the transmit IR group includes the primary cell; and
   transmitting first and second portions of the data block from the primary cell and the secondary cell respectively to the UE, wherein the first and second portions include different portions of the data block.

2. The method of claim 1, wherein selecting the secondary cell to join the transmit IR group comprises:
   comparing the neighboring cell measurement to a threshold; and
   selecting the secondary cell to join the transmit IR group for the UE based on the neighboring cell measurement being above the threshold.

3. The method of claim 1, wherein transmitting the first and second portions of the data block to the UE comprises transmitting simultaneously or substantially simultaneously the first and second portions of the data block from the primary cell and the secondary cell respectively to the UE.

4. The method of claim 3, wherein transmitting the first and second portions of the data block to the UE further comprises transmitting the first and second portions of the data block, on a same carrier frequency and same physical resource blocks (PRBs), from the primary cell and the secondary cell respectively to the UE.

5. The method of claim 3, wherein transmitting the first and second portions of the data block to the UE further comprises transmitting the first and second portions of the data block, on a same carrier frequency and different physical resource blocks (PRBs), from the primary cell and the secondary cell respectively to the UE.

6. The method of claim 3, wherein transmitting the first and second portions of the data block to the UE further comprises transmitting the first and second portions of the data block, on different carrier frequencies, from the primary cell and the secondary cell respectively to the UE.

7. The method of claim 1, wherein the first and second portions of the data block include overlapping and non-overlapping portions of the data block.

8. The method of claim 1, further comprising:
   signaling the created transmit IR group to the UE; and
   signaling a first redundancy version (RV) index of the primary cell to the UE.

9. The method of claim 8, further comprising:
   signaling the first RV index of the primary cell to the secondary cell; and
   computing, by the secondary cell, a second RV index of the secondary cell based on the first RV index.

10. The method of claim 9, wherein computing the second RV index based on the first RV index comprises computing the second RV index using the formula:

$$rvidx(2,i)=\text{modulus}(rvidx(1,i)+2,4)$$

were rvidx (2, i) represents the second RV index and rvidx (1, i) represents the first RV index.

11. A method for processing transmissions from a group of cells to a user equipment (UE), comprising:

transmitting to a primary cell a neighboring cell measurement associated with a secondary cell;

receiving, by the UE, first and second transmissions from a transmit incremental redundancy (IR) group formed by the primary cell based on the cell measurement, wherein the first and second transmissions include respectively first and second portions of a data block, and wherein the first and second portions are selected respectively based on first and second redundancy version (RV) indices;

generating combined soft bits from the first and second transmissions based on the first and second RV indices; and generating a bit sequence using the combined soft bits.

12. The method of claim 11, wherein the transmit IR group includes the primary cell and the secondary cell associated with the UE, and wherein receiving the first and second transmissions includes receiving the first and second transmissions from the primary and secondary cells respectively.

13. The method of claim 12, further comprising:
receiving from the primary cell an indication of the transmit IR group and the first RV index; and
determining the second RV index based on the first RV index.

14. The method of claim 13, wherein determining the second RV index based on the first RV index comprises computing the second RV index using the formula:

$$rvidx(2,i) = \text{modulus}(rvidx(1,i)+2,4)$$

where rvidx (2, i) represents the second RV index and rvidx (1, i) represents the first RV index.

15. The method of claim 11, wherein receiving the first and second transmissions comprises receiving simultaneously or substantially simultaneously the first and second transmissions by the UE.

16. The method of claim 11, wherein the first and second portions correspond to different portions of the data block, and wherein the first and second transmissions are received simultaneously or substantially simultaneously by the UE on a same carrier frequency and same physical resource blocks (PRBs), and wherein generating the combined soft bits comprises:
determining for a bit in the first portion whether or not the bit is redundant in the second portion; and
generating a log likelihood ratio (LLR) value for the bit responsive to the determination.

17. The method of claim 16, wherein determining whether or not the bit is redundant in the second portion comprises:
determining whether or not the bit is punctured in the second portion.

18. The method of claim 11, wherein generating the combined soft bits comprises:
generating first soft bits and second soft bits from the first and second transmissions; and
combining the first soft bits and the second soft bits based on the first and second RV indices to generate the combined soft bits,
wherein the first and second portions correspond to a same portion of the data block, wherein the first and second transmissions are received by the UE on a same carrier frequency and different physical resource blocks (PRBs), or wherein the first and second transmissions are received by the UE on different carrier frequencies.

19. The method of claim 18, wherein the first and second portions overlap in at least an overlapping portion of the data block, and wherein combining the first soft bits and the second soft bits comprises:
adding, soft bit by soft bit, a first group of the first soft bits with a corresponding second group of the second soft bits, wherein the first group of the first soft bits and the second group of the second soft bits each corresponds to the overlapping portion of the data block.

20. A user equipment (UE), comprising:
a transmitter configured to transmit a neighboring cell measurement associated with a secondary cell to a primary cell;
first and second receive antennas configured to receive first and second transmissions from a transmit incremental redundancy (IR) group formed by the primary cell based on the neighboring cell measurement, wherein the first and second transmissions include respectively first and second portions of a data block, and wherein the first and second portions are selected respectively based on first and second redundancy version (RV) indices;
a soft-output demapper configured to generate combined soft bits from the first and second transmissions based on the first and second RV indices; and
a decoder configured to generate a bit sequence using the combined soft bits.

21. The UE of claim 20, wherein the first and second portions correspond to different portions of the data block, wherein the first and second receive antennas are further configured to receive the first and second transmissions simultaneously or substantially simultaneously on a same carrier frequency and same physical resource blocks (PRBs), and wherein the soft-output demapper is further configured to:
determine for a bit in the first portion whether or not the bit is redundant in the second portion; and
generate a log likelihood ratio (LLR) value for the bit responsive to the determination.

22. The UE of claim 21, wherein the soft-output demapper is further configured to determine whether or not the bit is punctured in the second portion.

23. The UE of claim 20, further comprising:
at least a third receive antenna configured to receive a third transmission from the transmit IR group, wherein the transmit IR group includes at least the primary cell and the secondary cell.

24. A method for transmitting a data block from a group of cells to a user equipment (UE), comprising:
receiving from the UE, by a primary cell, a plurality of neighboring cell measurements associated with a plurality of secondary cells;
selecting a secondary cell from the plurality of secondary cells to join a transmit incremental redundancy (IR) group for the UE based on the plurality of neighboring cell measurements, wherein the transmit IR group includes the primary cell; and
transmitting a same portion of the data block from the primary cell and the secondary cell respectively to the UE, wherein the same portion of the data block is transmitted on a same carrier frequency and different physical resource blocks (PRBs) or on different carrier frequencies from the primary and secondary cells respectively to the UE.

* * * * *